United States Patent
Jüstel et al.

(10) Patent No.: US 6,559,598 B2
(45) Date of Patent: May 6, 2003

(54) PLASMA PICTURE SCREEN WITH UV LIGHT EMITTING LAYER

(75) Inventors: Thomas Jüstel, Aachen (DE); Hans-Helmut Bechtel, Roetgen (DE); Harald Gläser, Aachen (DE); Walter Mayr, Alsdorf (DE); Hans Nikol, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 114 days.

(21) Appl. No.: 09/795,616

(22) Filed: Feb. 28, 2001

(65) Prior Publication Data

US 2001/0024088 A1 Sep. 27, 2001

(30) Foreign Application Priority Data

Mar. 1, 2000 (DE) .......................... 100 09 915

(51) Int. Cl.⁷ ................................ H01J 17/49
(52) U.S. Cl. ................ 313/587; 313/586; 313/485; 313/487; 313/483; 250/301.4 P; 250/301.4 F
(58) Field of Search ................ 313/582, 586, 313/587, 485, 486, 487, 489; 250/301.4 P, 301.4 F, 301.4 R, 301.4 H

(56) References Cited

U.S. PATENT DOCUMENTS 5,747,100 A * 5/1998 Petersen .................. 427/157
6,187,225 B1 * 2/2001 Rao ..................... 252/301.4 H

FOREIGN PATENT DOCUMENTS

| JP | 09263756 A | * 10/1997 | ........... C09K/11/08 |
| JP | 2000133148 A | * 5/2000 | ........... H01J/11/02 |
| WO | WO 139239 A | * 5/2001 | ........... C09K/11/08 |

* cited by examiner

Primary Examiner—Nimeshkumar D. Patel
Assistant Examiner—Mariceli Santiago
(74) Attorney, Agent, or Firm—Aaron Waxler

(57) ABSTRACT

A plasma picture screen, in particular an AC plasma picture screen with a coplanar arrangement having an enhanced luminance. A UV light emitting layer (8) is provided on the front plate (1), which comprises a glass plate (3) on which a dielectric layer (4) and a protective layer (5) are provided, or on the carrier plate (2) with the phosphor (10). The layer (8) comprises a VUV phosphor which converts the VUV light of the plasma discharge into UV light with a wavelength between 200 and 350 nm and emits this in the direction of the phosphor layer (10).

13 Claims, 2 Drawing Sheets

PLASMA PICTURE SCREEN WITH UV LIGHT EMITTING LAYER

FIELD OF THE INVENTION

The invention relates to a plasma picture screen provided with a front plate which comprises a glass plate on which a dielectric layer and a protective layer are provided, with a carrier plate provided with a phosphor layer, with a ribbed structure which subdivides the space between the front plate and the carrier plate into gas-filled plasma cells, and with one or several electrode arrays on the front plate and the carrier plate for generating electrical corona discharges in the plasma cells.

BACKGROUND OF THE INVENTION

Plasma picture screens can generate color pictures with high resolution, large screen diagonal, and have a compact construction. A plasma picture screen comprises a hermetically closed glass cell which is filled with a gas, with electrodes arranged in a grid. The application of a voltage causes a gas discharge which generates mainly light in the vacuum ultraviolet range. This VUV light is converted into visible light by phosphors and emitted through the front plate of the glass cell to the viewer.

In principle, two types of AC plasma picture screens can be distinguished: a matrix arrangement and a coplanar arrangement of the electrode arrays. In the matrix arrangement, the gas discharge is ignited and maintained at the intersection of two electrodes, one on the front plate and one on the carrier plate. In the coplanar arrangement, the gas discharge is maintained between the electrodes on the front plate and ignited at the intersection point with an electrode, a so-called address electrode, on the carrier plate. The address electrode in this case lies under the phosphor layer.

The luminance of a plasma picture screen depends on several factors: 1. with what efficacy VUV light is generated in the plasma discharge; 2. with what efficacy the phosphors are excited by the VUV light; 3. with what efficacy the phosphors convert VUV light into visible light; and 4. with what efficacy the visible light from the plasma cell reaches the viewer.

In a coplanar arrangement of the electrode arrays, half of the VUV light generated in the gas discharge reaches the front plate, where it is absorbed by the layers present there. This effect is even further increased for part of the VUV light because the VUV light is re-absorbed in the gas space in that gas atoms are excited from their ground state to a higher energy level. The light is indeed emitted again subsequently, but it is diverted from its original direction, so that also light which had originally been directed towards the phosphor layer can reach the front plate. This reduces the efficacy with which the phosphors are excited by the VUV light.

The phosphor layer must be sufficiently thick and dense so that the VUV light emitted in the direction of the carrier plate is absorbed as fully as possible by the phosphor layer and converted into visible light. VUV photons which are not absorbed by the phosphor layer will reach the carrier plate and are absorbed therein. To prevent this, comparatively thick phosphor layers are used, or the particle size of the phosphors is reduced, which leads to a decrease in the VUV transmission for a given layer thickness. It is disadvantageous, however, that the efficacy of the phosphors is reduced in proportion as the particle diameter becomes smaller, and in particular the blue-emitting phosphors show an increased degradation.

SUMMARY OF THE INVENTION

The invention has for its object to provide a plasma picture screen with an improved luminance.

This object is achieved by means of a plasma picture screen provided with a front plate which comprises a glass plate on which a dielectric layer and a protective layer are provided, with a carrier plate provided with a phosphor layer, with a ribbed structure which subdivides the space between the front plate and the carrier plate into gas-filled plasma cells, and with one or several electrode arrays on the front plate and the carrier plate for generating electrical corona discharges in the plasma cells, and provided with an UV light emitting layer.

It is particularly preferred that the UV light emitting layer is provided on the protective layer.

The VUV light originating from the plasma discharge and emitted in the direction of the front plate is converted into UV light in the UV light emitting layer. The UV light is emitted towards the phosphor layer, where it is converted into visible light. Since the VUV photons emitted in the direction of the front plate are not absorbed there, but are converted into UV photons, substantially more photons will excite the phosphors on the carrier plate.

It is also preferred that the UV light emitting layer is provided between the carrier plate and the phosphor layer.

Transmitted VUV photons are not absorbed by the carrier plate, but are converted into UV photons by the UV light emitting layer. These UV photons are emitted in the direction of the phosphor layer and thus excite the phosphors.

It is particularly preferred that the UV light emitting layer emits UV-C light.

The photodegradation of phosphors by VUV light, for example of $Eu^{2+}$-activated phosphors in the phosphor layer, can be prevented by irradiation with UV-C light.

It is preferred that the UV light emitting layer comprises a VUV phosphor with a host lattice chosen from the group of alumninates, borates, fluorides, oxides, phosphates, and sulfates.

These host lattices are efficient VUV phosphor lattices because they have a great bandgap.

It is furthermore preferred that the UV light emitting layer comprises a VUV phosphor which is activated by $Pb^{2+}$, $Ce^{3+}$, $Pr^{3+}$, or $Bi^{3+}$.

These heavy metal ions are suitable activators for VUV phosphors.

It is furthermore preferred that the VUV phosphor in the UV emitting layer is chosen from the group $SrAl_{12}O_{19}:Ce$, $LaPO_4:Ce$, $CeMgAl_{11}O_{19}:Ce$, $LuBO_3:Pr$, $GdBO_3:Pr$, $LaBO_3:Pr$, $YBO_3:Pr$, $LaPO_4:Pr$, $YPO_4:Pr$, $LuPO_4:Pr$, $LaB_3O_6:Pr$, $SrSiO_3:Pb$, $MgSO_4:Pb$, $CaSO_4:Pb$, $SrSO_4:Pb$, $(Ca,Mg)SO_4:Pb$, $(Sr,Ca)SO_4:Pb$, $CaLi_2SiO_4:Pb$, $Ba(Y,Gd,Lu)B_9O_{16}:Bi$, $YF_3:Bi$, $YOF:Bi$, $Y_3Al_5O_{12}:Bi$ and $(Gd,La)B_3O_6:Bi$.

All these VUV phosphors show a small Stokes shift, i.e. the energy level distance between the excitation and emission bands is small, so that these phosphors emit UV light and no visible light.

It is preferred in particular that the VUV phosphor in the UV light emitting layer is $LaPO_4:Pr$.

$LaPO_4:Pr$ enhances the luminance of a plasma picture screen in a particularly efficient manner, because it has a high quantum efficiency $\Phi \geq 80\%$.

It is preferred in particular that the particles of the VUV phosphor are coated with MgO.

A coating of MgO acts as a stabilizing protective covering which reduces the photodegradation of the VUV phosphors. MgO forms a hard layer insoluble in water on the VUV phosphor particles, it does not react with the VUV phosphor, and is itself not degraded by radiation. The magnesium oxide is intrinsically colorless, so it does not affect the color value of the VUV phosphor.

In an advantageous embodiment, a UV light reflecting layer is provided on the front plate.

This layer has the purpose of reflecting UV light, which is emitted in the direction of the front plate, towards the phosphors.

It is preferred that the UV light reflecting layer comprises particles chosen from the group $SiO_2$, $MgF_2$, $Al_2O_3$, MgO, $Nb_2O_5$, $ZrO_2$, $Ta_2O_5$, $CaPO_4$, $LaPO_4$, $YPO_4$, $MgAl_2O_4$ and $YBO_3$, the average particle size lying between 100 nm and 500 nm in each case.

Particles of this composition show no or only a small absorption in the wavelength range from 200 to 400 nm and withstand the high temperatures prevailing during manufacture of a plasma picture screen. In addition, particles having this diameter show a substantially greater light scattering in the UV wavelength range than in the visible wavelength range. This also has the effect that the UV light reflecting layer transmits visible light.

Another favorable embodiment is characterized in that the UV light reflecting layer comprises a layer sequence with layers having a refractive index $n \geq 1.7$ alternating with layers having a refractive index $n \leq 1.5$.

In this embodiment, the materials used in the layer sequences are permeable to UV light and visible light. The individual layer thicknesses are chosen such that the UV light is reflected by interference, whereas visible light is optimally transmitted.

It is also preferred that the blue-emitting phosphor is $BaMgAl_{10}O_{17}$:Eu, the green-emitting phosphor is chosen from the group of $Zn_2SiO_4$:Mn and $BaMgAl_{10}O_{17}$:Eu,Mn, and the red-emitting phosphor is chosen from the group of $(Y,Gd)BO_3$:Eu, $Y_2O_3$:Eu, and $Y(V,P)O_4$:Eu in the phosphor layers on the carrier plate.

The blue-, red-, and green-emitting phosphors are chosen in dependence on the emission wavelength of the VUV phosphor used. The application of the VUV phosphors renders it possible to use phosphors in the phosphor layers whose excitation range lies outside the VUV range. Thus, for example, the red-emitting phosphor $Y(V,P)O_4$:Eu may be used instead of the frequently used $(Y,Gd)BO_3$ as the red-emitting phosphor, because the former has a better color point.

BRIEF DESCRIPTION OF THE DRAWING

The invention will be explained in more detail below with reference to two Figures and four embodiments, wherein.

DETAILED DESCRIPTION OF THE PRIMARY EMBODIMENT

Figure 1:
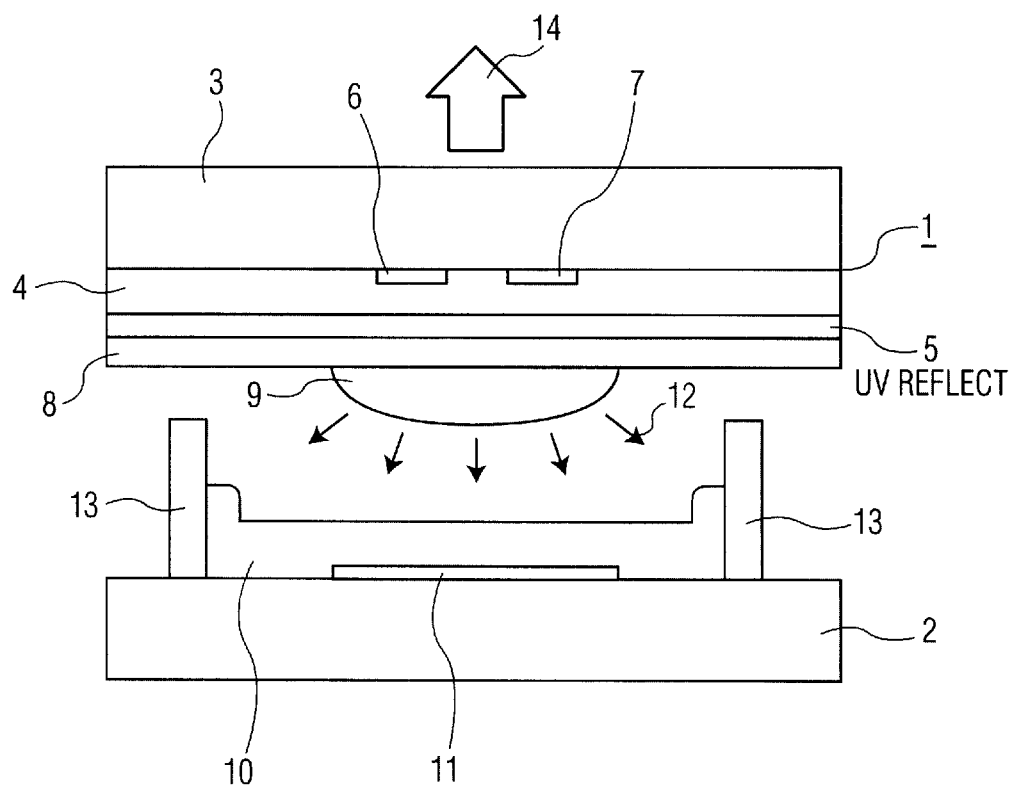
FIG. 1 shows the construction and operating principle of a single plasma cell in an AC plasma picture screen with a UV light emitting layer on the front plate.

In FIG. 1, a plasma cell of an AC plasma picture screen with a coplanar arrangement comprises a front plate 1 and a carrier plate 2. The front plate 1 comprises a glass plate 3 on which a dielectric layer 4 and thereon a protective layer 5 are provided. The protective layer 5 is preferably made of MgO, and the dielectric layer 4 is made, for example, of glass containing PbO. Parallel, strip-type discharge electrodes 6, 7 are provided on the glass plate 3 and are covered by the dielectric layer 4. The discharge electrodes 6, 7 are made, for example, from metal or ITO. A UV light emitting layer 8 is provided on the protective layer 5 and converts radiation 12 in the VUV range into UV radiation with wavelength of 200 to 350 nm. The carrier plate 2 is made of glass, and parallel, strip-type address electrodes 11, for example made of Ag, are provided on the carrier plate 2 so as to ran perpendicularly to the discharge electrodes 6, 7. Said address electrodes are covered with a phosphor layer 10 which emits in one of the three basic colors red, green, or blue. The individual plasma cells are separated by a ribbed structure 13 with separation ribs, preferably made of a dielectric material.

A gas is present in the plasma cell, also between the discharge electrodes 6, 7, which act alternately as the cathode and anode, preferably a rare gas mixture of, for example, He, Ne, Xe, or Kr. After the surface discharge has been ignited, whereby charges can flow along a discharge path which lies between the discharge electrodes 6, 7 in the plasma region 9, a plasma is formed in said plasma region 9 by means of which radiation 12 is generated in the UV range, in particular in the VUV range, in dependence on the composition of the gas. This radiation 12 and the UV radiation provided by the UV light emitting layer 8 excite the phosphor layer 12 into phosphorescence, thus emitting visible light 14 in one of the three basic colors, which light issues through the front plate 1 to the exterior and thereby forms a luminous pixel on the picture screen.

The dielectric layer 4 provided over the transparent discharge electrodes 6, 7 serves inter alia to obviate a direct discharge between the discharge electrodes 6, 7 made of conductive material in the AC plasma picture screen, and thus to prevent the formation of an arc during ignition of the discharge.

Figure 2:
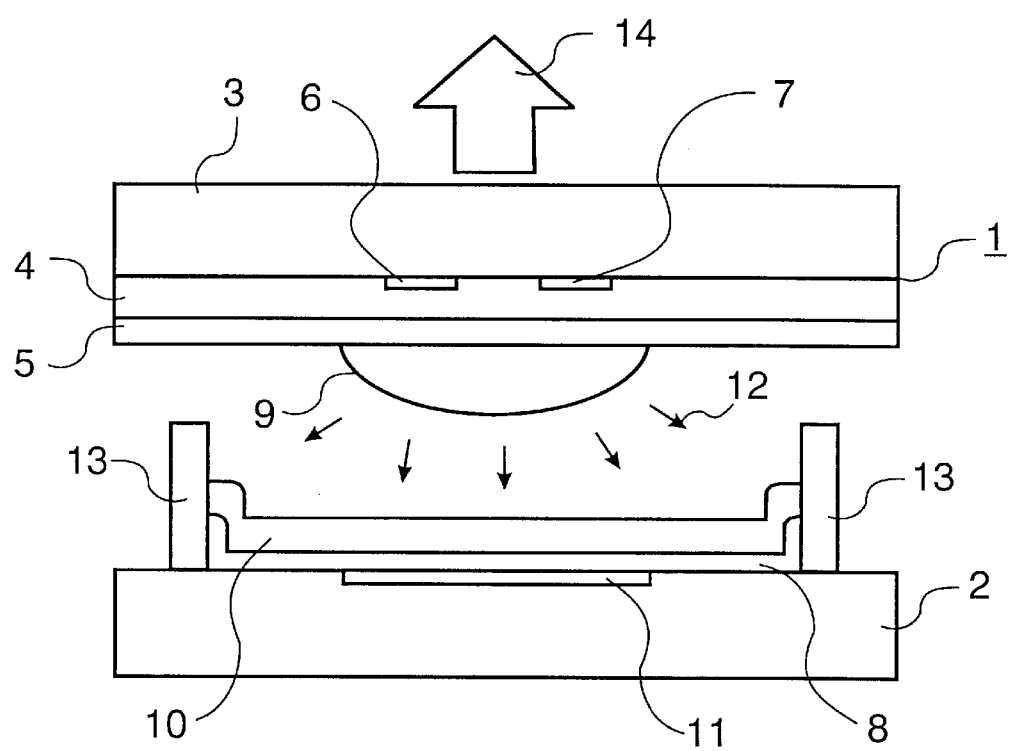
FIG. 2 shows the construction and operating principle of a single plasma cell in an AC plasma picture screen with a UV light emitting layer on the carrier plate.

FIG. 2 shows the construction and operating principle of a single plasma cell in an AC plasma picture screen which comprises a UV light emitting layer 8 on the carrier plate 2. The construction of this plasma cell is fully analogous to that of the plasma cell of FIG. 1, apart from the fact that the UV light emitting layer 8 lies between the carrier plate 2 and the phosphor layer 10. This UV light emitting layer 8 converts radiation 12 in the VUV range, transmitted by the phosphor layer 10, into UV radiation with a wavelength of 200 to 350 nm. This UV radiation excites the phosphor layer 10 into phosphorescence, thus emitting visible light 14 in one of the three basic colors, which light issues through the front plate 1 to the exterior and thus forms a luminous pixel on the picture screen. Otherwise, the operating principle is analogous to that of a plasma picture screen which has a UV light emitting layer 8 on its front plate 1.

To manufacture a front plate 1 with a layer 8 emitting UV light, the discharge electrodes 6, 7 are first provided on a glass plate 3 with dimensions corresponding to the desired picture screen format, by means of vapor deposition processes and subsequent structuring. Then a dielectric layer 4 and a protective layer 5 on the dielectric layer 4 are provided. The UV light emitting layer 8 is subsequently provided on the protective layer 5.

Manufacturing methods for such a UV light emitting layer 8 may be dry coating processes, for example electrostatic deposition or electrostatically supported dusting, as well as wet coating processes. In the latter case, a continuous layer may be provided by spin coating, meniscus coating, or blade coating. If the layer is to be structured, printing processes such as silk-screen printing or flexo-printing may be used.

For the wet coating processes, a VUV phosphor such as, for example, $SrAl_{12}O_{19}$:Ce, $LaPO_4$:Ce, $CeMgAl_{11}O_{19}$:Ce, $LuBO_3$:Pr, $GdBO_3$:Pr, $LaBO_3$:Pr, $YBO_3$:Pr, $LaPO_4$:Pr, $YPO_4$:Pr, $LuPO_4$:Pr, $LaB_3O_6$:Pr, $SrSiO_3$:Pb, $MgSO_4$:Pb, $CaSO_4$:Pb, $SrSO_4$:Pb, $(Ca,Mg)SO_4$:Pb, $(Sr,Ca)SO_4$:Pb, $CaLi_2SiO_4$:Pb, $Ba(Y,Gd,Lu)Bg_9O_{16}$:Bi, $YF_3$:Bi, YOF:Bi, $Y_3Al_5O_{12}$:Bi and $(Gd,La)B_3O_6$:Bi is dispersed in an organic solvent, possibly together with a dispersing agent, a surfactant, and an anti-foaming agent, or a binder preparation, as applicable. Suitable binder preparations for plasma picture screens are inorganic binders which can withstand the operating temperature of the plasma picture screen without decomposition, brittling, or discoloration, or organic binders which are removed by oxidation in a later stage of the manufacture of the plasma picture screen.

If the particles of the VUV phosphor in the UV light emitting layer 8 are to have a coating of MgO, the coated VUV phosphor is first manufactured. For this purpose, one or several water-soluble magnesium salts such as, for example, a nitrate, an acetate, or a perchlorate are dissolved in water, and the pH value of the solution is adjusted to a pH value of 7. The VUV phosphor to be coated is dispersed in this solution. Then the pH value of this suspension is increased to above 9, so that $Mg(OH)_2$ is deposited on the particles of the VUV phosphor. The $Mg(OH)_2$-coated VUV phosphor is filtered off, dried, and calcined at an elevated temperature, so that the $Mg(OH)_2$ is converted into MgO. Then a suspension of the coated VUV phosphor is prepared as described above and used for covering the protective layer 5.

Subsequently, the front plate 1 is used for the manufacture of an AC plasma picture screen together with further components such as, for example, a carrier plate 2 with address electrodes 11, covered with phosphor layers 10 which emit in one of the three basic colors red, green, or blue, and a mixture of rare gases.

The manufacture of a carrier plate 2 which has a layer 8 which emits UV light takes place in a manner analogous to that described for the front plate 1. After the UV light emitting layer 8 has been provided on the carrier plate 2, it is dried, and the phosphor layer 10 is subsequently provided. A suitable manufacturing method for such a phosphor layer 10 is a dry coating method, for example electrostatic deposition or electrostatically supported dusting, as well as a wet coating method, for example silk-screen printing, dispenser methods, in which a suspension is provided by means of a nozzle moving along the channels, or sedimentation from the liquid phase.

In the case of wet coating methods, the phosphors must be dispersed in water, an organic solvent, possibly together with a dispersing agent, a surfactant, and an antifoaming agent, or a binder preparation. Suitable binder preparations for plasma picture screens are inorganic binders which can withstand an operating temperature of 250° C. without decomposition, brittling, or discoloration, or organic binders which can be subsequently removed through oxidation.

After the phosphor layers 10 have been provided, the carrier plate 2 is used for manufacturing an AC plasma picture screen together with further components such as, for example, a front plate 1 and a mixture of rare gases.

The wavelength of the UV light which is generated by the UV light emitting layer 8 in the direction of the phosphor layer 10 determines the choice of the red-, blue-, and green-emitting phosphors in the phosphor layer 10. If a VUV phosphor is used which emits UV light with a wavelength between 200 and 250 nm, for example, the phosphors $BaMgAl_{10}O_{17}$:Eu, $Zn_2SiO_4$:Mn, and $(Y,Gd)BO_3$:Eu are used in the phosphor layer 10. Alternatively, $Y_2O_3$:Eu may also be used as the red-emitting phosphor in the luminescent layer 10, if so desired. If the VUV phosphor emits UV light with a wavelength between 250 and 300 nm, the phosphors $BaMgAl_{10}O_{17}$:Eu, $Zn_2SiO_4$:Mn, and $Y(V,P)O_4$:Eu may be used. In the case of emission of UV light with a wavelength between 300 and 350 nm, the phosphors $BaMgAl_{10}O_{17}$:Eu, $BaMgAl_{10}O_{17}$:Eu,Mn, and $Y(V,P)O_4$:Eu may be used.

The use of a VUV phosphor in the UV light reflecting layer 8 which radiates UV-C light is particularly advantageous for preventing the photodegradation of some phosphors, for example $Eu^{2+}$-activated phosphors, under VUV excitation.

The activator $Eu^{2+}$ is directly excited by irradiation of an $Eu^{2+}$-activated phosphor with UV light whose wavelength is 200 nm or more. The electronically excited $Eu^{2+}$ cation returns to its ground state under emission of a photon having a wavelength of 450 nm.

The excitation of the $Eu^{2+}$-activated phosphors with VUV light, by contrast, leads to an excitation of the host lattice. This results in the formation of excitons (electronhole pairs). A hole formed is captured by an $Eu^{2+}$ cation under formation of an $Eu^{3+}$ cation. The remaining electron may on the one hand be captured by an $Eu^{3+}$ cation under formation of an activated $Eu^{2+}$ cation, which then again returns to the ground state while emitting a photon of 450 nm wavelength. On the other hand, an electron may be captured by a defective location, referred to as anion void or also color center, in the crystal lattice of the phosphor. The problem in this case is that more $Eu^{3+}$ cations remain in existence, which cations interfere with the luminescence of the $Eu^{2+}$ cation.

These anion voids lie approximately 5 eV below the conduction band of the relevant phosphor in the case of $Eu^{2+}$-activated $BaMgAl_{10}O_{17}$:Eu. An electron present in such an anion void can be freed again through the supply of the required energy. The freed electron can subsequently be captured again either by an $Eu^{3+}$ cation or once more by an anion void. In the latter case, it can be freed again by a renewed supply of energy.

The energy required for freeing an electron from an anion void corresponds to the energy range of UV-C radiation of 200 to 300 nm. Irradiation of the phosphor with UV-C supplies the required energy for freeing electrons captured in anion voids again. The electrons can as it were be recycled.

In addition, the penetration depth of UV-C radiation into the phosphor particles is substantially greater than that of VUV radiation, because phosphors usually have a higher absorption constant for the light in the VUV range. The greater penetration depth results in a better saturation behavior, because more activators can be reached in the individual particles.

Alternatively, a layer which reflects UV light may be present on the front plate 1, for example between the protective layer 5 and the UV light emitting layer 8, or on the protective layer 5. This reflecting layer comprises a layer of particles having a diameter between 100 nm and 500 nm which exhibit a substantially greater light scattering in the UV wavelength range than in the visible wavelength range. To manufacture such a layer which reflects UV light, a suspension in water of $SiO_2$, $MgF_2$, $Al_2O_3$, MgO, $Nb_2O_5$, $ZrO_2$, $Ta_2O_5$, $LaPO_4$, $YPO_4$, $CaPO_4$, $MgAl_2O_4$, or $YBO_3$, to which subsequently an associative thickener and/or a dispersing agent may be added, is prepared. This suspension is provided on the protective layer 5 by one of the methods described further above and dried. If the UV light emitting layer 8 is to be present on the front plate 1, the UV light emitting layer 8 is subsequently provided on the light reflecting layer.

The UV light reflecting layer, however, may alternatively comprise a sequence of layers. The individual layers then have different refractive indices. The layer sequence thus comprises layers with a refractive index $n \geq 1.7$ and layers with a refractive index $n \leq 1.5$ in alternation. To manufacture such a layer sequence, layers of MnS or MgO and layers of $SiO_2$ are alternately provided by sputtering or vapor deposition. The ZnS or MgO layers have a refractive index $n \geq 1.7$, and the $SiO_2$ layers a refractive index $n \leq 1.5$. The two layers are provided in equal numbers.

In principle, a UV light emitting layer 8 may be used for all types of plasma picture screens such as, for example, AC plasma picture screens with or without matrix arrangement of the electrode arrays, or DC plasma picture screens.

Embodiments of the invention are described below, representing examples of how the invention may be carried into practice.

Embodiment 1

A suspension of $LaPO_4$:Pr was first prepared, to which additives such as an organic binder and a dispersing agent were added. The suspension of the VUV phosphor was provided on the protective layer 5 of a front plate 1 by spin coating, which front plate 1 comprises a glass plate 3, a dielectric layer 4, a protective layer 5, and discharge electrodes 6, 7. The dielectric layer 4 comprised glass containing PbO, the protective layer 5 comprised MgO, and the two discharge electrodes 6, 7 were made of ITO.

The entire front plate 1 was dried and given an aftertreatment of two hours at 400 to 600° C. The layer thickness of the UV light emitting layer 8 was 5 μm. Then the front plate 1 was used for assembling a plasma picture screen which showed an enhanced luminance.

Embodiment 2

100 ml of a 10% colloidal suspension of $SiO_2$ particles with a particle diameter of 200 nm was combined with 10 ml of a 10% pigment dispersing agent solution and 20 ml of a 10% associative thickener solution. The entire composition was thoroughly mixed. A layer of $SiO_2$ particles serving as the UV light reflecting layer was provided by spin coating on the protective layer 5 of a front plate 1, which comprised a glass plate 3, a dielectric layer 4, a protective layer 5, and discharge electrodes 6, 7. The dielectric layer 4 comprised glass containing PbO, the protective layer 5 comprised MgO, and the two discharge electrodes 6, 7 were made of ITO.

Subsequently a suspension of $LaPO_4$:Pr was prepared, to which additives such as an organic binder and a dispersing agent were added. The suspension was provided on the UV light reflecting layer by means of spin coating.

The entire front plate 1 was dried and given an aftertreatment for two hours at 400 to 600° C. The layer thickness of the UV light emitting layer 8 of $LaPO_4$:Pr was 1.5 μm, and that of the UV light reflecting layer of $SiO_2$ was 2 μm. The front plate 1 was subsequently used for assembling a plasma picture screen which showed an enhanced luminance.

Embodiment 3

First 1.0 g $Mg(NO_3)_2 \cdot 6H_2O$ (3.9 mmole) was dissolved in 50 ml distilled water. 8.0 g $YPO_4$:Pr was suspended in 50 ml distilled water, and the magnesium nitrate solution was subsequently added to this suspension. The pH value of the resulting suspension was raised to 9.1 through the supply of ammonia. After $Mg(OH)_2$ had been deposited on the VUV phosphor particles, the coated phosphor was filtered off, dried at 80° C., and finally calcined for 2 hours at 450° C.

Then a suspension was prepared with the MgO-coated VUV phosphor, to which additives such as an organic binder and a dispersing agent were added. The suspension was provided on the protective layer 5 of a front plate 1 by means of spin coating, said front plate comprising a glass plate 3, a dielectric layer 4, a protective layer 5, and discharge electrodes 6, 7.

The entire front plate 1 was dried and given an aftertreatment for two hours at 400 to 600° C. The layer thickness of the UV light emitting layer 8 was 3 μm. Then the front plate 1 was used for assembling a plasma picture screen with enhanced luminance.

Embodiment 4

A suspension of $LaPO_4$:Pr was first prepared, to which additives such as an organic binder and a dispersing agent were added. The suspension of the VUV phosphor was provided on a carrier plate 2 by means of silk-screen printing and dried. Then a suspension of the blue-emitting phosphor $BaMgAl_{10}O_{17}$:Eu was prepared, to which additives such as an organic binder and a dispersing agent were added. The suspension was provided on the UV light emitting layer 8 by means of silk-screen printing and dried. This process step was carried out in succession for the other two phosphor types with emission colors green and red.

All additives remaining in the phosphor layers 10 were removed by a thermal treatment of the carrier plate 2 at 400 to 600° C. in an atmosphere containing oxygen. Such a carrier plate 2 was then used for assembling a plasma picture screen with enhanced luminance.

What is claimed is:

1. A plasma picture screen provided with a front plate (1) which comprises a glass plate (3) on which a dielectric layer (4) and a protective layer (5) are provided, with a carrier plate (2) provided with a phosphor layer (10), with a ribbed structure (13) which subdivides the space between the front plate (1) and the carrier plate (2) into gas-filled plasma cells, and with one or several electrode arrays (6, 7, 11) on the front plate (1) and the carrier plate (2) for generating electrical corona discharges in the plasma cells, and provided with an UV light emitting layer (8).

2. A plasma picture screen as claimed in claim 1, characterized in that the UV light emitting layer (8) is provided on the protective layer (5).

3. A plasma picture screen as claimed in claim 1, characterized in that the UV light emitting layer (8) is provided between the carrier plate (2) and the phosphor layer (10).

4. A plasma picture screen as claimed in claim 1, characterized in that the UV light emitting layer (8) emits UV-C light.

5. A plasma picture screen as claimed in claim 1, characterized in that the UV light emitting layer (8) comprises a VUV phosphor with a host lattice chosen from the group of aluminates, borates, fluorides, oxides, phosphates, and sulfates.

6. A plasma picture screen as claimed in claim 1, characterized in that the UV light emitting layer (8) comprises a VUV phosphor which is activated by anion chosen from a group comprising $Pb^{2+}$, $Ce^{3+}$, $Pr^{3+}$, and $Bi^{3+}$.

7. A plasma picture screen as claimed in claim 1, characterized in that the VUV phosphor in an UV emitting layer (8) is chosen from the group $SrAl_{12}O_{19}$:Ce, $LaPO_4$:Ce, $CeMgAl_{11}O_{19}$:Ce, $LuBO_3$:Pr, $GdBO_3$:Pr, $LaBO_3$:Pr, $YBO_3$:Pr, $LaPO_4$:Pr, $YPO_4$:Pr, $LuPO_4$:Pr, $LaB_3O_6$:Pr, $SrSiO_3$:Pb, $MgSO_4$:Pb, $CaSO_4$:Pb, $SrSO_4$:Pb, $(Ca,Mg)SO_4$:Pb, $(Sr,Ca)SO_4$:Pb, $CaLi_2SiO_4$:Pb, $Ba(Y,Gd,Lu)B_9O_{16}$:Bi, $YF_3$:Bi, YOF:Bi, $Y_3Al_5O_{12}$:Bi and $(Gd,La)B_3O_6$:Bi.

8. A plasma picture screen as claimed in claim 7, characterized in that the VUV phosphor in the UV light emitting layer (8) is $LaPO_4$:Pr.

9. A plasma picture screen as claimed in claim 5, 6, 7, or 8, characterized in that the particles of a VUV phosphor are coated with MgO.

10. A plasma picture screen as claimed in claim 1, characterized in that a UV light reflecting layer is provided on the front plate (1).

11. A plasma screen as claimed in claim 10, characterized in that the UV light reflecting layer comprises particles chosen from the group $SiO_2$, $MgF_2$, $Al_2O_3$, MgO, $Nb_2O_5$, $ZrO_2$, $Ta_2O_5$, $CaPO_4$, $LaPO_4$, $YPO_4$, $MgAl_2O_4$ and $YBO_3$, the average particle size lying between 100 nm and 500 nm in each case.

12. A plasma picture screen as claimed in claim 10, characterized in that the UV light reflecting layer comprises a layer sequence with layers having a refractive index $n \leq 1.7$ alternating with layers having a refractive index $n \leq 1.5$.

13. A plasma picture screen as claimed in claim 1, characterized in that a blue-emitting phosphor is $BaMgAl_{10}O_{17}$:Eu, a green-emitting phosphor is chosen from the group of $Zn_2SiO_4$:Mn and $BaMgAl_{10}O_{17}$:Eu, Mn, and a red-emitting phosphor is chosen from the group of $(Y,Gd)BO_3$:Eu, $Y_2O_3$:EU, and $Y(V,P)O_4$:EU in phosphor layers (10) on the carrier plate (2).

* * * * *